QUARTER WAVE LIMITER CIRCUIT

Filed March 14, 1957 3 Sheets-Sheet 1

INVENTOR.
JEAN H. CLARK
BY Edward P. Redden
ATTORNEY

INVENTOR.
JEAN H. CLARK
BY Edward P. Bedden
ATTORNEY

QUARTER WAVE LIMITER CIRCUIT

Filed March 14, 1957 3 Sheets-Sheet 3

INVENTOR.
JEAN H. CLARK
BY Edward P. Bedden
ATTORNEY

United States Patent Office 2,979,677

Patented Apr. 11, 1961

2,979,677

QUARTER WAVE LIMITER CIRCUIT

Jean H. Clark, Covina, Calif.
(P.O. Box 326, Fallbrook, Calif.)

Filed Mar. 14, 1957, Ser. No. 646,070

15 Claims. (Cl. 333—35)

This invention relates to wave transmission networks and particularly to voltage or current limiting circuits utilizing such networks.

In radio and carrier current equipment and in some forms of measuring and testing equipment, a limiter circuit is employed to restrict the voltage or current to a predetermined maximum value. In the past, limiter circuits have utilized either electron tube or transistor circuits arranged to operate over a non-linear portion of their characteristic curves or non-linear impedances, usually of the biased diode or silicon carbide resistor types, in which the impedance of the device is a non-linear function of the voltage or current applied to the device.

This invention pertains to the second type of limiter circuits namely of the non-linear impedance types. This type of limiter circuit can be further divided into shunt limiter circuits and series limiter circuits. The shunt limiter circuits depend for their action on a non-linear impedance element whose impedance decreases rapidly when the voltage applied across the element exceeds a predetermined value. The series limiter circuits depend for their action on a non-linear impedance whose impedance increases rapidly when the current through the impedance exceeds a predetermined value.

When a shunt limiter impedance element is shunted across the circuit, and the voltage exceeds the predetermined value, the mismatch produced by the lower impedance rapidly increases the transmission loss of the circuit thereby decreasing or limiting the output voltage. The efficiency of the device is improved by using a transmission circuit of high impedance, thereby intensifying the mismatching effect of the shunt impedance. When a series limiter impedance element is connected in series in the circuit, and the current through impedance exceeds the predetermined value, the mismatch produced by the increased impedance rapidly increases the transmission loss of the circuit, thereby decreasing or limiting the output current. The efficiency of the series limiting impedance device is increased by using a transmission circuit of low impedance, thereby intensifying the mismatching effect of the series impedance.

Consider now the construction and operation of quarter wave transmission fines. The characteristic impedance $Z_0$, of a quarter wave line is the geometric means of its input impedance, $Z_i$, and the output impedance $Z_L$. Thus $Z_0^2=Z_i \cdot Z_L$ and $Z_L=Z_0^2/Z_i$. Quarter wave lines of a given characteristic impedance or artificial transmission lines having the given characteristic impedance, can be readily constructed by those skilled in the art and need not be further described here. If a line or a network simulating such a line, is designed with a characteristic impedance of 500 ohms and is terminated at one end by a 50 ohm impedance, the impedance transforming characteristic of the line cause this 50 ohm impedance to appear as a 5000 ohm impedance looking into the network from the other end of the line. Transmission lines are seldom designed and constructed with characteristic impedances of more than a few hundred ohms, but artificial transmission lines, utilizing lumped constants, can easily be designed and constructed with characteristic impedances of several thousand ohms.

As used in this specification and the claims, a quarter wave transmission line includes transmission lines which are some multiple of a half wave length plus a quarter wave length line. Such transmission lines, i.e., a multiple of half wave lengths longer than a single quarter wave length, behave electrically substantially the same as a transmission line of a single quarter wave in length. They are however, much more sensitive to frequency variations. As used in this specification and the claims, the terms quarter wave line and quarter wave networks are synonymous and include both conventional lines and lumped constant networks, as well as wave guides and cavity resonators.

It is therefore an object of this invention to provide an improved limiting circuit utilizing in combination at least one quarter wave transmission line and at least one limiting device connected to one of the terminals of said transmission line.

It is another object of this invention to provide an improved limiting circuit utilizing quarter wave lines and limiter elements connected in a manner to intensify the mismatch losses of the limiter elements when subjected to energy in excess of a predetermined value.

It is a further object of this invention to provide an improved limiter circuit comprising a combination of quarter wave networks and at least one limiting element to provide improved limiting action by the intensification of mismatch losses and also to provide desirable input and output impedances by means of the impedance transforming action of the quarter wave networks.

It is another object of this invention to provide an improved limiting network comprising a quarter wave transmission network and shunt type limiter elements connected across the input and output terminals of the network and being characterized by having a decreased impedance when subjected to voltages in excess of a predetermined value.

It is a further object of this invention to provide an improved limiter network comprising at least one quarter wave network and at least one series limiter element connected to one of the terminals of the network and characterized by having an increased impedance when subjected to current in excess of a preselected magnitude.

It is another object of this invention to provide an improved limiting network for connecting a source of electrical energy to a load comprising two or more quarter wave transmission networks connected in tandem and having characteristic impedances to normally match the impedance of said source to the impedance of said load and at least one limiter element connected to said series connected transmission networks in a manner to result in a mismatch between said source and said load whenever the electrical energy supplied by said source exceeds a predetermined value.

Other objects of this invention will become apparent from the following description taken in connection with the accompanying drawings in which Fig. 1 is a block diagram of the limiter circuit contemplated by this invention utilizing a single quarter wave network and two shunt limiter elements;

Figure 1:
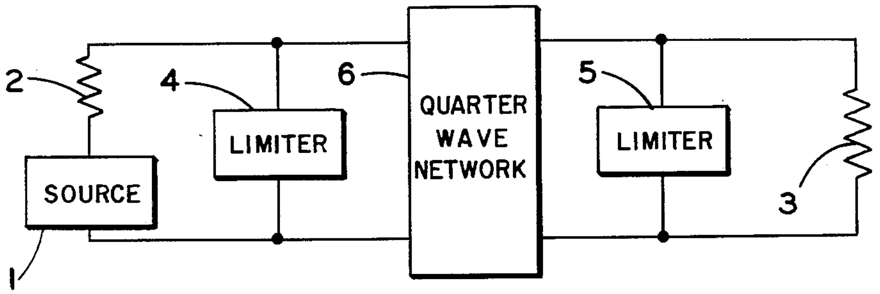

Referring now to Fig. 1 a block diagram of a typical limiter circuit contemplated by this invention and utilizing a quarter wave transmission line in conjunction with shunt limiting elements is shown. This limiting circuit is coupled between source 1 having internal impedance 2 and load 3. The limiting circuit consists of shunt type limiter elements 4 and 5 and quarter wave network 6. The design frequency of quarter wave network 6 is within the band width of the source signals and preferably the geometric mean of the upper and lower band edge frequencies of the source signals. Network 6 is preferably designed to match source impedance 2 to load impedance 3. Limiter elements 4 and 5 are designed to have high impedance when the voltage across their terminals is less than a predetermined value. When designed in this manner and as long as the voltage of source 1 does not exceed a predetermined value, the transmission loss of the coupling network is substantially zero. When the voltage produced by source 1 exceeds the predetermined value, the impedance of shunt type limiter element 4 decreases. It is to be noted that the input impedance to quarter wave network 6 is source impedance 2 and the impedance of shunt limiter element 4 connected in parallel. Normally the impedance of shunt limiter element 4 is so high as to be negligible compared to source impedance 2.

When the impedance of limiter element 4 decreases, as above described, the total input impedance to network 6 decreases. This decreased input impedance when coupled through network 6 appears as an increased impedance when viewed from the load side due to the impedance transforming action of the network. The output voltage of the network attempts to increase, but is restrained by the action of shunt limiter element 5 which is sensitive to any increase in the applied voltage. Limiter element 5 thereupon decreases its impedance. It is to be noted that the output impedance to quarter wave network 6 is load impedance 3 and the impedance of shunt limiter element 5 connected in parallel. The decrease in impedance of limiter element 5 decreases this total output impedance. Because of the impedance transforming action of network 6, this decrease in output impedance is reflected back to appear as an increased impedance when viewed from the input terminals of network 6. Thus the action of the network is to cause both limiters 4 and 5 to start at the same time and also to increase the transmission loss of the whole device as a function of voltage level, since each limiter reflects a high impedance through the network to the other limiter. This higher impedance improves the limiting action.

The device shown in Fig. 1 presents a low impedance during limiting toward both internal impedance 2 of source 1 and load 3. When this is undesirable, additional quarter wave networks may be inserted between source 1 and shunt type limiter element 4 and between load 3 and shunt type limiter element 5. This circuit is shown in block diagram by Fig. 2 in which quarter wave network

7 is inserted between source 1 and element 4 and quarter wave network 8 is inserted between load 3 and element 5. The impedance transforming action of these quarter wave networks results in both source 1 and load 3 being presented with a high impedance during limiting action. It is readily apparent that either of the additional quarter wave networks may be eliminated if such is desired.

Figure 3:
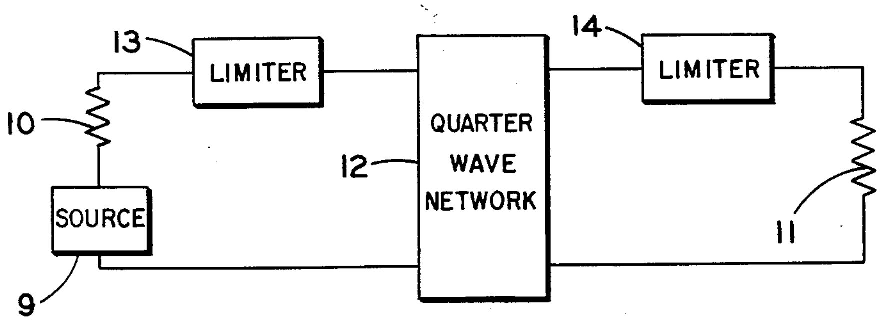
Fig. 3 is a block diagram of an alternate limiter circuit contemplated by this invention and utilizing a single quarter wave network and two series limiter elements.

Referring now to Fig. 3 a block diagram of a typical limiting circuit contemplated by this invention and utilizing a quarter wave network in conjunction with series limiting elements is shown. In this embodiment voltage source 9 having internal impedance 10 is coupled to load 11 through quarter wave network 12 and series type limiter elements 13 and 14. The action of the various components is similar to that previously described with respect to Fig. 1, except that when limiting starts, the limiter elements increase in impedance in the manner of series type limiters. This increased impedance results in a total increase in the input impedance to network 12 which appears, when viewed from the output terminals of the network, to be a decrease in impedance. The current through limiter element 14 and load 11 attempts to rise but is retarded by the limiting action of element 14. When element 14 starts limiting, its impedance increases, thereby increasing the total impedance across the output of network 12. This in turn is reflected back to appear as a decreased impedance at the input terminals of network 12. Network 12 therefore presents a low impedance to both source 9 and limiter 13 connected in series and to load 11 and limiter 14 connected in series, thereby improving the efficiency of the device. In this case also, additional quarter wave networks (not shown) can be added between source 9 and limiter 13 and between load 11 and limiter 14 to present a lower input or output impedance to one or both of the load or source.

Figure 4:
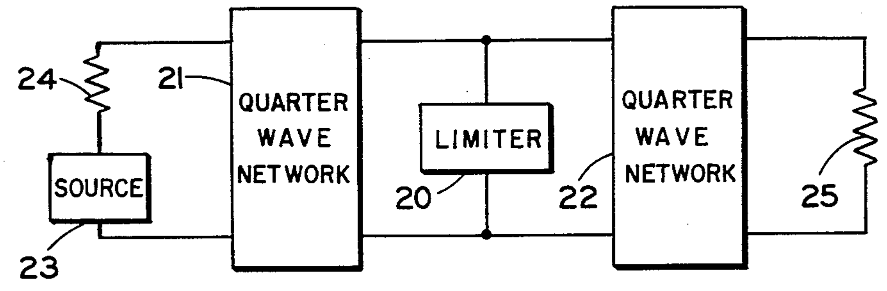
Fig. 4 is a block diagram of an alternate limiter circuit contemplated by this invention and utilizing two quarter wave networks and a single shunt limiter element.

Referring now to Fig. 4 a block diagram of an alternate embodiment of the limiter circuit contemplated by this invention is shown. In this embodiment a single shunt type limiter element 20 is used with two quarter wave networks 21 and 22. Source 23 having internal impedance 24 is coupled to the input terminals of quarter wave network 21 while load 25 is connected across the output terminals of quarter wave network 22. Shunt type limiter element 20 is designed to have lower impedance whenever the voltage applied across its terminals exceeds a predetermined value. Networks 21 and 22 are preferably designed to match the impedances of internal impedance 24 and load impedance 25, respectively, to a preselected large impedance compared to impedances 24 and 25. The characteristic impedance of the internal impedance 24 and load 25. Under normal operating conditions, i.e., when the voltage of source 23 does not exceed a predetermined value, each of networks 21 and 22 has substantially zero transmission loss. When the voltage from source 23 exceeds this predetermined value, however, the increased potential when applied across limiter element 20, results in a decreased impedance of element 20. This decreased impedance is coupled back through network 21 and appears as an increase in impedance due to the impedance transforming action of the network. The decrease in impedance of element 20 is also coupled through network 22 and appears as an increase in impedance when viewed from the output terminals of network 22. The effect of a change in impedance of element 20 is therefore magnified and the increases in the transmission losses of both networks 21 and 22 results in maintaining substantially a constant voltage across load 25.

Figure 5:
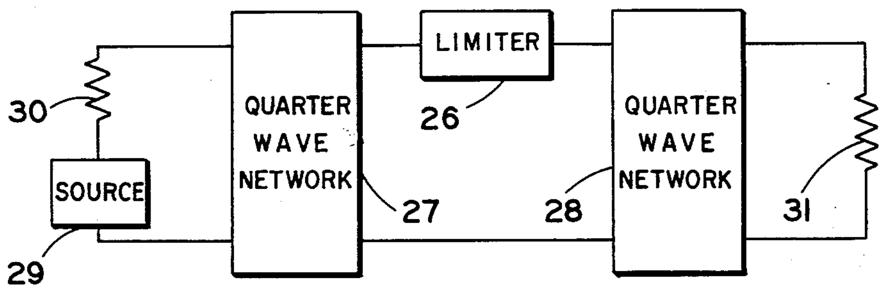
Fig. 5 is a block diagram of an alternate limiter circuit contemplated by this invention and utilizing two quarter wave networks and a single series limiter element.

Referring now to Fig. 5 a block diagram of an alternate embodiment of the limiter circuit contemplated by this invention is shown. In this embodiment, which is similar to that of Fig. 4, series type limiter element 26 is utilized with two quarter wave networks 27 and 28. Soure 29 having internal impedance 30 is connected to the input terminals of network 27 while load 31 is connected to the output terminals of network 28. As long as the current flowing through the networks between source 29 and load 31 does not exceed a predetermined value, the impedance of element 26 remains at a comparatively low value. Networks 27 and 28 are usually designed with characteristic impedances which are lower than the impedances of internal impedance 30 and load 31. When the current flowing through element 26 exceeds the predetermined value, the impedance of element 26 increases resulting in a net increase in impedance across the output terminals of network 27 and across the input terminals of network 28. This increased impedance is coupled through networks 27 and 28 and appears as a decrease in impedance when viewed from the input terminals of network 27 and the output terminals of network 28. Due to the mismatch in the impedances applied to both networks 27 and 28, there are generated large transmission losses in the networks. These transmission losses result in the desired limiting of the current flowing to load 31 from source 29. It is to be noted that these transmission losses are substantially a function of the magnitude of the current level flowing through element 26. Therefore, the greater the current level above the preselected value, the greater the transmission losses and hence the greater the resulting drop in the current level at load 31.

Although normally the quarter wave networks utilized in each of Figs. 1 through 5 are designed to attain an impedance match between the source impedance and the load, this need not be so. Thus the quarter wave networks may be designed for some other impedance than that required to attain such an impedance match in order to secure improved operation. In Fig. 1, network 6 may be designed for a higher impedance than either source impedance 2 or load 3. This will result in some mismatch losses below the limiting threshold but this is often of no importance since limiting operation only may be desired.

Figure 2:
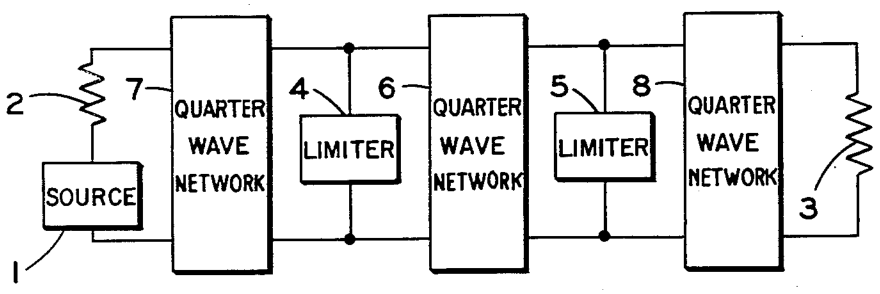
Fig. 2 is a block diagram of the limiter circuit contemplated by this invention utilizing three quarter wave networks and two shunt limiter elements.

The arrangement of Fig. 2 eliminates this difficulty in constructing comparatively low impedance networks. For example, for source and load impedances of 500 ohms, network 7 may be designed for 1500 ohms, network 6 may be designed for 4500 ohms and network 8 may be designed for 1500 ohms. Networks having characteristic impedance of these magnitudes are easily designed utilizing lumped constants in arrangements such as those shown in Fig. 6. It is to be noted that the 1500 ohm networks 7 and 8 in the example normally match the 500 ohm source impedance 2 and load 3, respectively to the 4500 ohm network 6. Shunt type limitter elements 4 and 5 are now connected across a line with a larger normal impedance thereby making their limiting action more effective. This principle can be employed by designing the networks for impedances larger than the source and load impedance as in Fig. 4 or for impedances lower than the source and load impedances in the case of Fig. 5.

Figure 6:
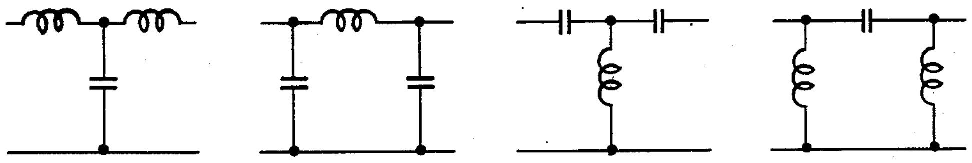
Fig. 6 is a series of schematic drawings of various types of artificial transmission lines utilizing lumped constants and which can be utilized in the limiter circuits contemplated by this invention.

Fig. 6 illustrates schematically various well-known arrangements of lump constants which can be constructed as electrical equivalents of quarter wave transmission lines. The design and construction of such artificial transmission lines are well-known to those skilled in the art and need not be further described here.

Figure 7:
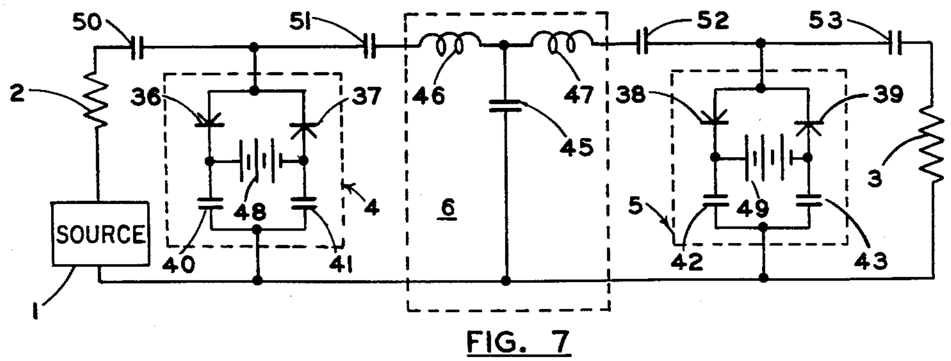
Fig. 7 is a schematic drawing of a typical limiter element contemplated by this invention of the type shown in block diagram in Fig. 1.

Referring now to Fig. 7 a schematic drawing of a typical limiter circuit constructed similar to that shown in block diagram form in Fig. 1 is shown. The limiter circuit connects source 1 having internal impedance 2 to load 3. Quarter wave network 6 consists of a plurality of lump constants such as capacitor 45 and inductors 46 and 47 and is preferably designed to match impedance 2 with the impedance of load 3. Shunt type limiter elements 4 and 5 consist of crystal diodes 36, 37, 38 and 39 which are in this case biased in a backward or non-conducting direction by voltage sources 48 and 49. Blocking capacitors 40, 41, 42, 43, 50, 51, 52 and 53 are provided and have low impedances at the frequencies involved. Voltage sources 48 and 49 may be the same source of D.C. potential. These sources may be small dry cell batteries or the voltages may be derived from some other point in the circuit.

Figure 8:
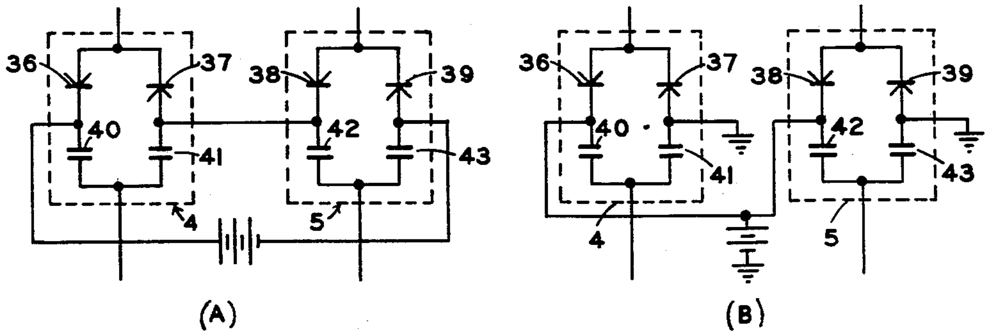
Fig. 8 is a schematic drawing of various alternate connections to the limiter elements shown in Fig. 7.

Alternate methods of applying the biasing voltage to crystal diodes 36 through 39 are shown in Fig. 8. The series connection of the crystal diodes shown in Fig. 8(*a*) to the biasing source while the diodes themselves remain in shunt across the high frequency circuit is particularly advantageous. The action of the limiter is enhanced by this action because the rectified current flowing in the bias circuit is in the forward direction for all the diodes and tends to lower their resistance.

Figure 9:
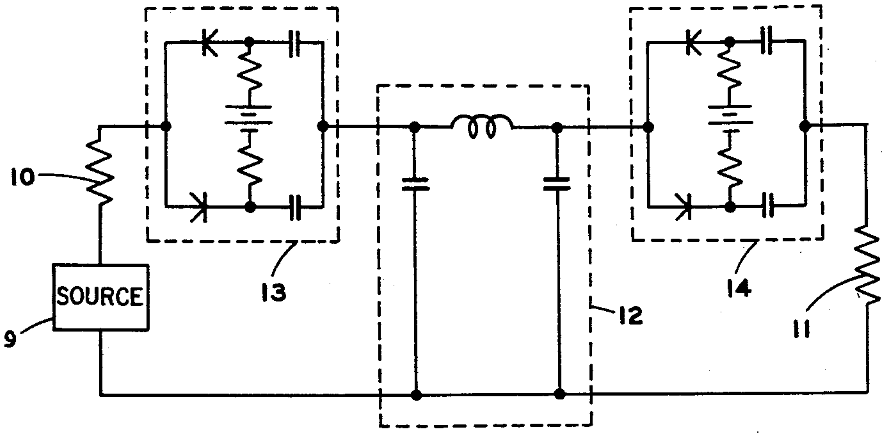
Fig. 9 is a schematic drawing of a typical limiter circuit contemplated by this invention of the type shown in block diagram in Fig. 3.

In Fig 9 a schematic drawing of a typical limiter circuit constructed similar to that shown in block diagram form in Fig. 3 is shown. This limiter circuit utilizes series type limiter elements as previously described.

Combinations of the various figures may be used in tandem to secure better limiting and different bias voltages or bias currents may be employed to change the operating levels. The shunt limiter elements may consist of germanium or silicon crystal diodes, vacuum tube rectifiers, silicon carbide resistors, gaseous tubes, or special voltage regulator crystal diodes used with or without bias voltages or currents to secure the proper operating point. The series limiter elements usually consists of germanium, silicon, or electron tube diode rectifiers biased in the forward direction by a small substantially constant current. There are no frequency limitations to the use of the limiter circuit contemplated by this invention, except that the band width of the circuit is preferably limited to about 25% of the center frequency for best operation. If the frequency changes more than this, the quarter wave network impedance transforming effects decrease and the circuit becomes less efficient as a limiter.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A quarter wave limiter circuit adapted to couple alternating current electrical energy from a source thereof of signals having frequencies within a preselected band width to a load comprising a quarter wave length transmission network having a design frequency within said preselected band width and having a characteristic impedance which is substantially the geometric mean between the internal impedance of said source and the impedance of said load; a shunt type limiter element having a high impedance when subjected to voltages below a predetermined value and reduced impedance when subjected to voltages in excess of said predetermined value connected across the input terminals of said quarter wave length transmission line; and a second shunt type limiter element having a high impedance when subjected to voltages below said predetermined value and reduced impedance when subjected to voltages above said predetermined value connected across the output terminals of said quarter wave length transmission line whereby when said limiter circuit is connected between said source and said load said transmission line is substantially lossless as long as the voltage from said source does not exceed said predetermined value and when the voltage from said source exceeds said predetermined value the transmission losses of said transmission line are substantially a function of the magnitude of said excess voltage.

2. A quarter wave limiter circuit adapted to couple alternating current electrical energy from a source thereof of signals having frequencies within a presselected band width to a load with minimum transmission losses when the current from said source does not extend a predetermined value and with substantial transmisison losses when said current from said source exceeds said predetermined value, said transmission losses being a function of the magnitude of said excess current comprising a quarter wave length transmission line having a design frequency within said preselected band width and having a characteristic impedance which is substantially the geometric mean between the internal impedance of said source and the impedance of said load; a series type limiter element having a low impedance to current flow below said predetermined value and a substantially higher impedance when subjected to current flow in excess of said predetermined value connected in series with said transmission line to the input terminals thereof; and a second series type limiter element having a low impedance to current flow below said predetermined value and a substantially higher impedance when subjected to current flow in excess of said predetermined value and connected in series with said transmission line to the output terminals thereof.

3. A quarter wave limiter circuit adapted to convey alternating current electrical energy from a source thereof of signals having frequencies within a preselected band width to a load with minimum transmission losses as long as the voltage from said source does not exceed a predetermined value and with substantial transmission losses when said voltage from said source does exceed said predetermined value comprising a quarter wave transmission line having a design frequency within said preselected band width and having a characteristic impedance which is substantially the geometric mean between the internal impedance of said source and a second preselected impedance; a second quarter wave length transmisison line having a design frequency within said preselected band width connected in series with said first transmission line and having a characteristic impedance which is substantially the geometric mean between the impedance of said load and said second preselected impedance; and a shunt type limiter element connected across the common connection between said transmission lines and having a high impedance when subjected to a voltage below said predetermined value and a substantially lower impedance when subjected to a voltage above said predetermined value.

4. A quarter wave limiter circuit adapted to convey alternating current electrical energy from a source thereof of signals having frequencies within a preselected band width to a load with minimum transmission losses as long as the current flow from said source to said load does not exceed a predetermined value and with substantial transmission losses when said current flow exceeds said predetermined value comprising a quarter wave transmission line having a design frequency within said preselected band width and having a characteristic impedance which is substantially the geometric mean between the internal impedance of said source and a second preselected impedance; a second quarter wave transmission line having a design frequency within said preselected band width connected in series with said first quarter wave transmission line and having a characteristic impedance which is substantially the geometric mean between the impedance of said load and said second preselected impedance; and a series type limiter element connected in series between said transmission lines and having a low impedance when conducting current below said predetermined value and a substantially increased impedance when conducting current above said predetermined value.

5. A quarter wave limiter circuit for limiting variations in alternating current electrical energy conveyed between a source of signals having frequencies within a preselected band width and a load comprising a quarter wave transmission line having a design frequency within said preselected band width; a first limiter element connected in series with said transmission line at one end thereof; and a second limiter element connected in series with said transmission line at the other end thereof, said limiter elements being constructed in a manner to cause an impedance mismatch of said transmission line when actuated with said mismatch enhanced by the impedance transforming action of said quarter wave transmission line.

6. A quarter wave limiter circuit as recited in claim 5 in which said quarter wave transmission line has a characteristic impedance which is substantially the geometric mean between the internal impedance of said source and the impedance of said load.

7. A quarter wave limiter circuit as recited in claim 5 and further comprising at least one additional quarter wave transmission line having a design frequency within said preselected band width connected in tandem with said first quarter wave transmisson line with one of said limiter elements connected at the junction of said transmission lines.

8. A quarter wave limiter circuit as recited in claim 5 and further comprising a second quarter wave transmission line having a design frequency within said preselected band width connected in tandem with said first quarter wave transmission line with said first limiter element connected at the junction thereof; and a third quarter wave transmisson line having a design frequency within said preselected band width connected in tandem with said first quarter wave transmission line at the other end thereof with said second limiter element connected at the junction thereof.

9. A limiter circuit for limiting variations in alternating current electrical energy conveyed between a source thereof of signals having frequencies within a preselected band width and a load comprising two quarter wave networks having design frequencies within said preselected band width connected in tandem; and a limiter element connected at the junction of said two quarter wave networks.

10. A limiter circuit as recited in claim 9 in which said two quarter wave networks have characteristic impedances which match the internal impedance of said source to a predetermined impedance and the impedance of said load to said predetermined impedance, respectively, and in which said limiter element has an unactuated impedance of a magnitude to cause negligible losses in said quarter wave networks and an actuated impedance which causes losses in said quarter wave networks to vary by a preselected function of said limiting variations in electrical energy.

11. A quarter wave limiter circuit comprising a source of alternating current electrical energy having frequencies within a preselected band width and having an internal impedance; a load; a quarter wave network having a design frequency within said band width connecting said source to said load; a limiter element connected between said source and said quarter wave network; and a second limiter element connected between said load and said quarter wave network.

12. A quarter wave limiter circuit as recited in claim 11 in which said quarter wave network has a characteristic impedance which is substantially the geometric mean between the internal impedance of said source and the impedance of said load.

13. A quarter wave limiter circuit comprising a source of alternating current voltage of frequencies within a preselected band width having an internal impedance; a load; a quarter wave network having a design frequency within said preselected band width connecting said source to said load and having a characteristic impedance which is substantially the geometric mean between the internal impedance of said source and the impedance of said load; a shunt limiter element connected between said source and said quarter wave network; and a second shunt limiter element connected between said load and said quarter wave network.

14. A quarter wave limiter circuit comprising a source of alternating current signals of frequencies within a preselected band width having an internal impedance; a load; a quarter wave network having a design frequency within said preselected band width connecting said source to said load and having a characteristic impedance which is substantially the geometric mean between said internal impedance of said source and the impedance of said load; a series limiter element connected between said source and said quarter wave network; and a second series limiter element connected between said load and said quarter wave network.

15. A quarter wave limiter circuit comprising a source of alternating current electrical energy of frequencies within a preselected band width having an internal impedance; a load; a first quarter wave transmission line having a design frequency within said preselected band width; a second quarter wave transmission line having a design frequency within said preselected band width connected in tandem with said first quarter wave transmission line at one end thereof; a third quarter wave transmission line having a design frequency within said preselected band width connected in tandem with said first and second quarter wave transmission lines at the other end of said first quarter wave transmission line; a limiter element connected at the junction of said first and second quarter wave transmission lines; and a second limiter element connected at the junction of said first and third quarter wave transmission lines in which the characteristic impedance of said three quarter wave transmission lines are selected to substantially match the internal impedance of said source to the impedance of said load and in which said limiter elements are characterized by having a change of impedance whenever the electrical energy from said source exceeds a predetermined value.

References Cited in the file of this patent

UNITED STATES PATENTS

| | | |
|---|---|---|
| 1,811,963 | Peterson | June 30, 1931 |
| 2,249,597 | Brown | July 15, 1941 |
| 2,729,793 | Anderson | Jan. 3, 1956 |
| 2,763,841 | Simkins | Sept. 18, 1956 |